United States Patent Office 3,125,558
Patented Mar. 17, 1964

3,125,558
ORGANOALUMINUM-TRANSITION METAL HALIDE-ALKALI METAL FLUORIDE FOR OLEFIN POLYMERIZATION
Hugh J. Hagemeyer, Jr., and Marvin B. Edwards, Longview, Tex., assignors to Eastman Kodak Company, Rochester, N.Y., a corporation of New Jersey
No Drawing. Filed Feb. 17, 1959, Ser. No. 793,686
13 Claims. (Cl. 260—93.7)

This invention relates to the catalytic polymerization of normally gaseous α-monoolefins to solid polymers having an unusually high degree of crystallinity and at polymerization rates much higher than were obtainable by catalytic processes known heretofore. The invention relates particularly to the polymerization of propylene and higher α-monoolefins as well as mixtures of α-monoolefins to form solid high-density polymers at greatly increased rates, the polymers exhibiting a higher degree of crystallinity than normally exhibited by the solid high-density polymers prepared by other catalytic processes.

Polyethylene has heretofore been prepared by high-pressure processes to give relatively flexible polymers having a rather high degree of chain branching and a density considerably lower than the theoretical density. Pressures of the order of 500 atmospheres or more and usually of the order of 1,000 to 1,500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not fully understood. Furthermore, the activity of the catalysts ordinarily depends upon certain specific catalyst combinations, and the results are ordinarily highly unpredictable, since relatively minor changes in the catalyst combinations often lead to liquid polymers rather than the desired polymers. Also catalyst combinations that have been found to be quite effective for polymerizing ethylene to a high-density, highly crystalline polymer are quite often considerably less effective and sometimes virtually ineffective for the polymerization of propylene to similar types of polymers.

Certain of the trialkyl aluminum compounds have been used in conjunction with certain inorganic halides to give high-molecular weight polyethylene. For example, triethyl aluminum in conjunction with titanium tetrachloride permits a low temperature, low pressure polymerization of ethylene to form a crystalline product. When this catalyst mixture is employed to polymerize propylene the product is predominantly polymeric oils and rubbers with a relatively small amount of high molecular weight crystalline product. When the same aluminum triethyl is used in conjunction with a titanium tetraalkoxide, such as titanium tetrabutoxide, the mixture does not produce solid polyethylene for some reason which is not apparent. A mixture of an alkyl aluminum dihalide and a titanium tetraalkoxide can be used to polymerize ethylene to form high-density crystalline polymers, but when this catalyst combination is used to polymerize propylene and higher α-monoolefins high yields of polymeric oils and rubbers are produced.

Some of the catalysts that are effective for producing crystalline high-density polyethylene cannot be used to produce a crystalline polypropylene. Also, slight variations in the composition of the catalysts known to be effective for producing crystalline polyethylene can result in the production of undesirably large amounts of polymeric oils and rubbers, in the polymerization of either ethylene or propylene. Thus, one cannot predict whether a specific catalyst combination will be effective to produce crystalline high-density polymers from specific α-monoolefins.

This invention is concerned with, and has for an object, the provision of improved processes whereby α-monoolefins, particularly propylene and higher α-monoolefins, can be readily polymerized to give high molecular weight, highly crystalline polymers. It is another object of this invention to provide an improved catalyst combination having unexpected catalytic activity for the polymerization of α-monoolefins to form crystalline high-density polymers. It is another object of this invention to polymerize α-monoolefins in the presence of a novel catalyst combination that makes it possible to produce substantially exclusively highly crystalline, high molecular weight polyolefins, and the formation of less valuable oils and amorphous rubbery polymers is virtually eliminated. It is still another object of this invention to provide a novel olefin polymerization catalyst that is readily reproduceable and that results in rapid polymerization rates for the production of highly crystalline, high density polymers. Other objects of this invention will be apparent from the detailed description and claims which follow.

This application is a continuation-in-part of our co-pending application Serial No. 561,662, filed January 26, 1956.

The above and other objects are attained by means of this invention wherein α-monoolefins either singly or in admixture are readily polymerized to high molecular weight solid polymers by effecting the polymerization in the presence of a catalytic mixture containing alkyl aluminum halides having one of the structural formulas $RAlX_2$ and $R_3Al_2X_3$, wherein R is selected from the group consisting of alkyl radicals containing from 1 to 12 carbon atoms, phenyl and benzyl and X is a halogen atom selected from the group consisting of chlorine, bromine, and iodine, a halide of a transition metal selected from the group consisting of titanium, vanadium, chromium, molybdenum, and zirconium, the halogen atoms again being selected from the group consisting of bromine, chlorine, and iodine, and an alkali metal fluoride, said alkali metal being selected from the group consisting of sodium, potassium, and lithium. The preferred catalyst of this invention is composed of a mixture of ethyl aluminum sesquichloride, titanium trichloride and sodium fluoride.

The discovery that alkali metal fluorides can be employed in the catalyst compositions of this invention is believed to be quite unexpected. It is even more unexpected to discover that the alkali metal fluorides function in the catalyst mixture in such a manner that the polymerization rate is substantially increased, and the polymerization of the α-monoolefin is directed toward the production of highly crystalline high-density polymers. On the basis of previous experience, it is believed that in the catalyst mixture of this invention the alkali metal fluorides would have been expected to react with the organo-aluminum compound to produce an aluminum trialkyl. However, it appears quite unlikely that the alkali metal fluorides function in that manner. We have found that when the organo-aluminum compound and alkali metal fluoride were pre-activated in a polymerization solvent and then treated with the transition metal halide, the resulting catalyst gave substantially poorer results in propylene polymerization reactions than those runs in which the organo-aluminum compound and transition metal halide were permitted to form a complex prior to the addition of the alkali metal fluoride. These facts indicate that the alkali metal fluoride does not function in the catalyst composition in the expected manner, and it also appears that the order of addition of the catalyst components to the catalyst composition is quite important in order to obtain the most desirable yields of polymer. In practicing this invention, it is also important to prepare the catalyst compositions in a highly concentrated form and to permit the catalyst components to undergo reaction completely before being diluted with any reaction medium and before being contacted with the α-monolefin to be polymerized. A suitable period of time for reaction of the components of the catalyst mixture is a period of about one hour. However, other reaction periods can be employed; for example, from 0.25 to 5 hours.

The manner in which the catalyst composition of this invention is prepared is quite important. The organo-aluminum compound that is employed can be either an alkyl aluminum sesquihalide or an alkyl aluminum dihalide. The sesquihalide is preferred because of its ready availability. The transition metal halide is preferably employed in a reduced form, i.e the transition metal is in an oxidation state which is lower than its maximum state of oxidation. For that reason, such transition metal halides as titanium trichloride, vanadium tetrachloride and vanadium trichloride are preferred in our catalyst compositions. However, it will be understood that the transition metal halides can be in a state of maximum oxidation or an unreduced form. In preparing the catalyst composition, the transition metal halide is preferably added to the organo-aluminum compound which is either in the pure state or in a concentrated solution, for example, 50% by weight in the reaction medium. After these two components of the catalyst mixture have undergone sufficient reaction, the alkali metal fluoride is added to the catalyst mixture, and the resulting mixture is stirred at room temperature until reaction is completed. Completion of the reaction is normally accomplished in a period of about one hour. The resulting catalyst composition can be charged directly to the polymerization reactor. If desired, the catalyst composition can be elutriated in order to improve the results by washing with pure solvent until the liquid overflowing from the elutriation vessel no longer contains any halide.

The three-component catalyst embodying this invention are of particular utility because of the fact that the polymer formed consists entirely of the desired solid high molecular weight, highly crystalline polymer without the concomitant formation of low molecular weight waxes and oils. When this characteristic is combined with the exceptional yields obtained in accordance with this invention, a truly commercial process is obtained which can be readily carried out on a large scale. The catalyst compositions of this invention preferably contain from 0.5 to 6 moles of organo-aluminum compound per mole of transition metal halide and 0.5 to 12 moles of alkali metal fluoride per mole of transition metal halide. Catalyst ratios outside these ranges can be used, but usually such variations are undesirable from the standpoint of the type of product made and the product yield.

In practicing the invention, the organo-aluminum compound is preferably an alkyl aluminum sesquichloride, said alkyl radicals containing from 1 to 12 carbon atoms such as methyl, ethyl, propyl, butyl, hexyl, octyl, decyl, dodecyl, and the like. The transition metal halide is desirably a titanium or vanadium halide with titanium trichloride being preferred. As has been indicated, sodium fluoride is preferably employed as the alkali metal fluoride, although potassium or lithium fluorides can be used. The empirical nature of the catalysis is evidenced by the fact that the individual components of the catalyst mixture are each unsuccessful as catalysts for forming solid polyolefins.

A particular advantage of the invention is that it employs, as catalyst components, materials which are readily available and inexpensive. The catalyst systems included within the scope of the invention include, in the most preferred embodiments, a catalytic mixture of 2 moles of ethyl aluminum sesquichloride, 6 moles of sodium fluoride and 1 mole of titanium trichloride.

The inventive process can be carried out in liquid phase in an inert organic liquid, and preferably in inert liquid hydrocarbon vehicle, and the removal of catalyst is facilitated by operating below the melting point of the polymer. The process can also be carried out in the absence of a diluent using the α-monoolefin itself as the reaction medium. The process proceeds with excellent results over a relatively wide temperature range with temperatures of 20–120° C. being preferably employed, and particularly good results being obtained in the range of 50–100° C. The preferred temperature range is 70–90° C. The pressure can be varied as desired, with pressures as low as atmospheric pressure being operable. Generally speaking, however, it is desirable to employ a pressure in the range of 0–1000 p.s.i.g. with pressures of from 10 to 1000 p.s.i.g. being preferred for optimum yields. In some cases, higher pressures such as are employed in the conventional high pressure processes can be used but are usually not necessary. Thus, pressures of as much as 20,000 p.s.i.g. or higher can be used in some instances. The great increase in polymerization rate with increasing pressures makes the use of pressures of 300–500 p.s.i. desirable.

The invention is applicable for polymerizing any of the well-known α-monoolefinic hydrocarbons and preferably those containing from 2 to 10 carbon atoms. In most cases, the invention is particularly applicable for polymerizing ethylene, propylene, the butenes or mixtures thereof, although any of the α-monoolefins can be used or any mixtures of α-monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weight greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C.

The polyethylenes of this invention are highly crystalline and usually exhibit crystallinity above 90% as shown by X-ray diagrams. Ordinarily, the crystallinities of the polyethylenes obtained by this process average close to 96%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixture include such materials as 1-butene, isobutylene, 1-pentene, 1-decene, and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The catalyst mixtures embodying the invention have several important advantages over the prior art processes. One advantage resides in the fact that the conversion of the olefins, and particularly ethylene or propylene or mixtures thereof, so solid polymers of high molecular weight is essentially complete. Byproducts such as the low molecular weight oils, aromatics or greases are not formed. One of the particular advantages is the faster polymerization rate which is achieved. The inclusion of the alkali metal fluoride produces a pronounced acceleration of the rate of reaction. The economic advantages of the higher space-time yields resulting therefrom are obvious. Another advantage of the invention is that the process is operative at relatively low temperatures and employing considerably lower catalyst concentrations than are ordinarily used, in prior art processes. These factors contribute to the production of a cleaner polymer which is more suitable for use as a commercial plastic material. The melt index and average molecular weight of the product can be controlled within rather narrow limits by suitable regulation of the relative proportions of the various catalyst components. This provides a simple and sensitive control over the nature of the polymer produced. The superior stability of the catalyst systems of this invention to accidental inactivation permits more precise control of catalyst concentration. The polymers produced according to the process of the present invention are of superior quality. The polyethylenes, for example, are composed almost exclusively of straight chain hydrocarbons and have higher melting points, tensile strengths, stiffness and density than materials commercially available at this time. One particular characteristic of the products embodying the invention is their unusually high crystallinity. Thus, polypropylene prepared according to the present invention has a crystallinity of 75–80%, whereas the polypropylene prepared by previously known processes contains a very high amount of amorphous material.

The process embodying the invention can be carried out at pressures as low as atmospheric pressure. The increase in polymerization rate with a slight increase in the pressure of the gaseous α-monoolefin is so great, however, that it is generally preferred to operate at pressures of 300–500 p.s.i. in commercial practice. Pressures of the order of 10–1000 p.s.i. can be employed with good results and allow considerable economy over the conventional high pressure processes which operate in the range of 1000–2000 atmospheres in most cases. When the polymerization is carried out at atmospheric pressure, it can be effected simply by bubbling gaseous monoolefin through a stirred catalyst mixture. Temperatures between 20 and 120° C. can be used with temperatures of 50–100° C. being preferably employed, and the optimum temperature range being 70–90° C. The polymerization is conveniently carried out in a rather dilute slurry of the catalyst components in an inert solvent. The concentration of catalyst in the solvent can be from about 0.05% to about 5% with the preferred range being 0.1–4%.

Separation of catalyst from the polymer can be accomplished in any desired manner. It is readily accomplished by washing the crude polymer with boiling alcohol, such as isobutyl alcohol. Three or four washes are usually sufficient to reduce the ash content of the polymer to a satisfactory level. The alkali metal fluorides are difficultly soluble in alcohol and are removed from the polymer either by treatment with boiling water or filtration of a solution of the polymer. Water and alcohol can be removed from the polymer powder by conventional drying techniques.

The only limitation on the temperature at which the process can be effected is the decomposition temperature of the catalyst. The pressure employed need be only sufficient to maintain the reaction mixture in liquid form during the polymerization, although moderate pressures are desirable for optimum yield. Since the catalyst mixture employed consists of components which are either readily soluble or readily dispersible in the organic liquid vehicles commonly employed, the uniformity of reaction can be readily controlled. The exact nature of the catalytic action between the components of the mixture is not wholly understood, and particularly the reason why the mixture has such greatly increased activity is not understood.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The propylene or other α-monoolefin can be charged to the polymerization mixture either as a pure material or in admixture with other materails such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

In the preparation of the uniform polymers by the continuous flowing stream process, the temperature is desirably maintained at a substantially constant value within the preferred range in order to achieve the highest degree of uniformity. The concentration of the monomer in the vehicle will vary rather widely depending upon the reaction conditions and will usually range from about 2 to 50% by weight, or preferably from about 20% to about 30% by weight based on the weight of the vehicle. Higher concentrations of the monomer ordinarily increase the rate of polymerization, but the rates obtained by means of this invention are so high that this is not generally a significant factor. The polymerization time can be varied as desired from a period of a few minutes or hours to several days. The acceleration in polymerization rates characteristic of this invention makes it possible to carry out the polymerizations at considerably shorter times than was possible heretofore.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, and any of the other well known inert liquid hydrocarbons.

The polymerization ordinarily is accomplished by merely admixing the components of the polymerization mixture, and then heating and cooling as required to maintain the desired polymerization temperature. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof. It will be understood, however, that the examples are illustrative only and are not intended to limit the scope of the invention unless otherwise specifically indicated.

Example 1

A catalyst for propylene polymerization was prepared by dissolving 17.36 g. of ethyl aluminum sesquichloride in 40 ml. of mineral spirits solvent. To this solution was added 5.40 g. of titanium trichloride and 8.82 g. of sodium fluoride. Considerable heat was evolved when the sodium fluoride was added. The catalyst mixture was agitated at room temperature for one hour and then charged together with 500 ml. of mineral spirits to a 2-liter stirred autoclave. The mixture was heated to 93° C. and propylene was pumped in to a pressure of 1000 p.s.i. Polymerization was continued for 12 hours. The crude polypropylene was removed from the autoclave and the catalyst residues were removed by extraction with hot isobutyl alcohol and hot water. After drying, the polypropylene weighed 150 g. The crystallinity of the crude product, as determined by exhaustive extraction with hexane, was 80 percent. The inherent viscosity of the crude product was 1.92 as determined on a 0.25% (w./v.) solution in tetralin at 145° C. The inherent viscosity of the hexane-extracted product was 2.01.

Example 2

The improved results which may be obtained in propylene polymerization by the use of the sodium fluoride additive is illustrated in the following example in which the mole ratio of ethyl aluminum sesquichloride to titanium trichloride is the same as in Example 1. The omission of sodium fluoride caused a very marked decrease in yield and in inherent viscosity of the crude polymer. In this case the catalyst was prepared from 19.4 g. of ethyl aluminum sesquichloride dissolved in 40 ml. of mineral spirits and 6.0 g. of titanium trichloride. The polymerization was carried out in the same manner as in Example 1, that is, in 500 ml. of mineral spirits solvent in a 2-liter autoclave at 95° C. for 12 hours under 1000 p.s.i. of propylene pressure. The polypropylene formed amounted to 39 grams. The melt index of this material was greater than 100 and the inherent viscosity was 0.62.

Example 3

The effect of order of mixing of catalyst components on catalyst activity is shown by this example. A 2-liter autoclave was charged with a mixture of 17.36 g. of ethyl aluminum sesquichloride, 17.64 g. of sodium fluoride and 250 ml. of mineral spirits. The mixture was heated at 180° C. for 3 hours. At the end of this period the autoclave was cooled and 5.40 g. of titanium trichloride suspended in 250 ml. of mineral spirits was added to the autoclave. The mixture was then heated to 80° C. and propylene was pumped in to a pressure of 1000 p.s.i. Polymerization was continued for 6 hours. The polypropylene formed amounted to 44 grams. This material was 51.5 percent crystalline and had a melt index of 2.0.

Example 4

A catalyst prepared by adding 5.40 g. of titanium trichloride to 17.36 g. of ethyl aluminum sesquichloride dissolved in 50 ml. of mineral spirits and then stirred with 8.82 g. of sodium fluoride for one hour at room temperature was diluted with 500 ml. of mineral spirits and charged to a 2-liter stirred autoclave. The mixture was heated to 80° C. and 400 g. of butene-1 was pumped in. The mixture was agitated to 80° C. for 18 hours. At the end of this period the crude polybutene was removed and separated from catalyst residues by treatment with hot methanol. The polybutene recovered amounted to 332 grams. The melting point of this material was 116–122° C.

Example 5

To 50 ml. of mineral spirits was added 17.36 g. of ethyl aluminum sesquichloride. Titanium trichloride (5.40 g.) was added followed by 4.41 g. of sodium fluoride. The resulting slurry was stirred vigorously at 60° C. for one hour. At the end of this time unreacted ethyl aluminum sesquichloride as well as soluble compounds formed during the formation of the catalyst complex were washed from the mixture by repeated washing with pure mineral spirits solvent. The catalyst was then diluted with 750 ml. of xylene and charged to a 2-liter stirred autoclave. The mixture was heated to 75° C. and propylene was pumped in to a pressure of 600 pounds. The reaction mixture was agitated at 75–80° C. for 6 hours. The crude polypropylene thus formed was worked up by extracting repeatedly with hot isobutyl alcohol followed by a treatment with boiling water. The polypropylene formed amounted to 168 g. and was 82.8 percent crystalline. The material had a melt index of 2.1 and an inherent viscosity of 1.89.

Example 6

A catalyst mixture was prepared by mixing 17.36 g. of ethyl aluminum sesquichloride, 40 ml. of mineral spirits, and 6.75 g. of vanadium tetrachloride. To this mixture was added 8.82 g. of sodium fluoride. The catalyst was activated by stirring at 60° C. for one hour. The catalyst slurry was charged together with 1000 ml. of mineral spirits to a 2-liter stirred autoclave. The mixture was heated to 90° C., propylene was pumped into a pressure of 1000 p.s.i., and polymerization was continued at 90° C. for a period of 6 hours. The polypropylene formed amounted to 145 grams. This product had a crystallinity of 84.1 percent, an inherent viscosity of 1.89, and a melt index of 1.5.

Example 7

A catalyst complex was prepared by diluting 17.80 g. of ethyl aluminum dichloride with 50 ml. of mineral spirits, adding 5.40 g. of titanium trichloride, and finally adding 8.82 g. of sodium fluoride. The complex formation was completed by stirring the mixture at 100° C. for 30 minutes. The active catalyst slurry was washed free of excess ethyl aluminum dichloride and soluble compounds formed during the catalyst forming reaction and then diluted with 1 liter of mineral spirits. This mixture was charged to a 2-liter stirred autoclave and contacted with propylene at 1000 p.s.i. and at 85° C. for 6 hours. During this time 168 g. of solid polypropylene was formed. This material was 78.5 percent crystalline, had a melt index of 3.5, and an inherent viscosity of 1.78.

Example 8

A solid catalyst complex for propylene polymerization was prepared from the following components: 17.36 g. of ethyl aluminum sesquichloride, 5.40 g. of titanium trichloride, and 5.46 g. of lithium fluoride. The titanium trichloride was added to the ethyl aluminum sesquichloride, lithium fluoride was added to the mixture, and finally 30 ml. of mineral spirits solvent was added in order to form a slurry. This mixture was heated to 85° C. and propylene was pumped in to a pressure of 1000 p.s.i. Polymerization was continued at 85° C. for 6 hours. Additional propylene was pumped in twice to restore the pressure to 1000 pounds. At the end of the reaction period the autoclave was cooled and opened and found to be completely filled with solid polypropylene. This material was washed with isobutanol, methanol, water, and finally methanol again. The yield of solid polypropylene was 600 grams. This material was 85.2 percent crystalline. The inherent viscosity was 1.95 and the melt index was 2.2.

*Example 9*

Desirable results are obtained using the process of Example 8 for polymerization of pentene-1, hexene-1,3-methyl-1-butene, and 4-methyl-1-pentene. The ethyl aluminum sesquichloride can also be replaced by ethyl aluminum dichloride, propyl aluminum sesquibromide, butyl aluminum dibromide, pentyl aluminum sesquiiodide, and hexyl aluminum diiodide.

The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

We claim:

1. In the polymerization of an α-monoolefin to form solid polymer by means of a catalyst consisting essentially of an alkyl aluminum halide selected from the group consisting of RAlX$_2$ and R$_3$Al$_2$X$_3$, wherein R is selected from the group consisting of alkyl radicals containing from 1–12 carbon atoms, phenyl and benzyl, and X is a halogen atom selected from the group consisting of chlorine, bromine, and iodine, and a halide of a transition metal selected from the group consisting of titanium, vanadium, chromium, molybdenum, and zirconium, the halogen atom being selected from the group consisting of bromine, chlorine, and iodine, the improvement which comprises effecting the polymerization in the presence of an alkali metal fluoride as a third component for the catalyst, said catalyst containing from 0.5 to 6 moles of alkyl aluminum halide and from 0.5 to 12 moles of alkali metal fluoride per mole of transition metal halide.

2. In the polymerization of an α-monoolefin to form solid polymer, the improvement in preparing polymer of exceptional crystallinity at increased rates which comprises effecting the polymerization in the presence of a catalyst consisting essentially of an alkyl aluminum sesquichloride, the alkyl radicals containing from 1–12 carbon atoms, a titanium halide, the halogen atoms being selected from the group consisting of chlorine, bromine, and iodine, and an alkali metal fluoride, said catalyst containing from 0.5 to 6 moles of alkyl aluminum sesquichloride and from 0.5 to 12 moles of alkali metal fluoride per mole of titanium halide.

3. In the polymerization of propylene to form solid polymer, the improvement in preparing polymer of exceptional crystallinity at increased rates which comprises effecting the polymerization in an inert organic liquid vehicle at a temperature within the range of 20–120° C. and in the presence of a catalyst consisting essentially of ethyl aluminum sesquichloride, titanium trichloride and sodium fluoride, said catalyst containing from 0.5 to 6 moles of ethyl aluminum sesquichloride and from 0.5 to 12 moles of sodium fluoride per mole of titanium trichloride.

4. In a polymerization of butene-1 to form solid polymer, the improvement in preparing polymer of exceptional crystallinity at increased rates which comprises effecting the polymerization in an inert organic liquid vehicle at a temperature within the range of 20–120° C. and in the presence of a catalyst consisting essentially of ethyl aluminum sesquichloride, titanium trichloride, and lithium fluoride, said catalyst containing from 0.5 to 6 moles of ethyl aluminum sesquichloride and from 0.5 to 12 moles of lithium fluoride per mole of titanium trichloride.

5. In the polymerization of propylene to form solid polymer, the improvement in preparing polymer of exceptional crystallinity at increased rates which comprises effecting the polymerization in an inert normally liquid saturated hydrocarbon diluent at a temperature within the range of 50–120° C. and in the presence of a catalyst consisting essentially of ethyl aluminum sesquichloride, titanium trichloride and sodium fluoride, the catalyst containing from 0.5 to 6 moles of ethyl aluminum sesquichloride and from 0.5 to 12 moles of sodium fluoride per mole of titanium trichloride.

6. In the polymerization of propylene to form solid polymer, the improvement in preparing polymer of exceptional crystallinity at increased rates which comprises effecting the polymerization in a normally liquid saturated aliphatic hydrocarbon diluent at a temperature within the range of 70–90° C. and in the presence of a catalyst consisting essentially of about 2 moles of ethyl aluminum sesquichloride and about 6 moles of sodium fluoride per mole of titanium chloride, the concentration of catalyst in the reaction medium being within the range of 0.05 to 5 percent by weight.

7. The process according to claim 6 wherein the catalyst is prepared by adding titanium trichloride to ethyl aluminum sesquichloride and subsequently adding sodium fluoride to the mixture and reacting the three components of the catalyst for a period of 0.25 to 5 hours.

8. As a composition of matter, a catalyst for the polymerization of α-monoolefins to solid crystalline polymer, said catalyst consisting essentially of an alkyl aluminum halide selected from the group consisting of RAlX$_2$ and R$_3$Al$_2$X$_3$, wherein R is selected from the group consisting of alkyl radicals containing from 1–12 carbon atoms, phenyl and benzyl, and X is a halogen atom selected from the group consisting of chlorine, bromine, and iodine, a halide of a transition metal selected from the group consisting of titanium, vanadium, chromium, molybdenum, and zirconium, the halogen atoms being selected from the group consisting of chlorine, bromine, and iodine and an alkali metal fluoride, said catalyst containing from 0.5 to 6 moles of alkyl aluminum halide and from 0.5 to 12 moles of alkali metal fluoride per mole of transition metal halide.

9. As a composition of matter, a catalyst for the polymerization of α-monoolefins to solid crystalline polymer, said catalyst consisting essentially of an alkyl aluminum sesquichloride, the alkyl radicals containing from 1–12 carbon atoms, a titanium halide, the halogen atoms being selected from the group consisting of chlorine, bromine, and iodine and sodium fluoride, said catalyst containing from 0.5 to 6 moles of alkyl aluminum sesquichloride and from 0.5 to 12 moles of sodium fluoride per mole of titanium halide.

10. As a composition of matter, a catalyst for the polymerization of propylene to solid crystalline polymer, said catalyst consisting essentially of 0.5 to 6 moles of ethyl aluminum sesquichloride and from 0.5 to 12 moles of sodium fluoride per mole of titanium trichloride.

11. As a composition of matter, a catalyst for the polymerization of propylene to solid crystalline polymer, said catalyst consisting essentially of ethyl aluminum sesquichloride, titanium trichloride, and lithium fluoride, said catalyst containing from 0.5 to 6 moles of ethyl aluminum sesquichloride and from 0.5 to 12 moles of lithium fluoride per mole of titanium trichloride.

12. The method for preparing a catalyst for the polymerization of $\alpha$-monoolefins to solid highly crystalline polymer, which comprises mixing titanium halide with an alkyl aluminum sesquichloride, adding an alkali metal fluoride to the mixture and permitting the resulting reaction mixture to react for a period of time within the range of 0.25 to 5 hours, said catalyst containing from 0.5 to 6 moles of alkyl aluminum sesquichloride and from 0.5 to 12 moles of alkali metal fluoride per mole of titanium halide.

13. The method for preparing a catalytic mixture for the polymerization of propylene to solid highly crystalline polymer, which comprises adding titanium trichloride to ethyl aluminum sesquichloride and subsequently adding sodium fluoride to the mixture, permitting the resulting mixture to react for a period of from 0.5 to 5 hours at room temperature, and washing reaction product with an inert normally liquid hydrocarbon solvent until the wash liquid is substantially free of halide, said catalytic mixture containing from 0.5 to 6 moles of ethyl aluminum sesquichloride and from 0.5 to 12 moles of sodium fluoride per mole of titanium trichloride.

References Cited in the file of this patent

UNITED STATES PATENTS

| | | |
|---|---|---|
| 2,824,089 | Peters et al. | Feb. 18, 1958 |
| 2,829,136 | Fotis et al. | Apr. 1, 1958 |
| 2,843,577 | Friedlander et al. | July 15, 1958 |
| 2,886,560 | Weber et al. | May 12, 1959 |
| 2,899,413 | Hagemeyer et al. | Aug. 11, 1959 |
| 2,909,510 | Thomas | Oct. 20, 1959 |
| 2,909,511 | Thomas | Oct. 20, 1959 |
| 2,925,410 | Coover | Feb. 16, 1960 |
| 2,943,063 | Eby et al. | June 28, 1960 |
| 2,980,663 | Lachowicz | Apr. 18, 1961 |

FOREIGN PATENTS

| | | |
|---|---|---|
| 779,540 | Great Britain | July 24, 1957 |

OTHER REFERENCES

Industrial and Engineering Chemistry, volume 49, No. 12, December 1957, page 45A.